United States Patent [19]

Ballatore

[11] Patent Number: 5,214,670
[45] Date of Patent: May 25, 1993

[54] EQUALIZATION SYSTEM AND METHOD FOR EQUALIZING A BASE-BAND TELECOMMUNICATION LINE

[75] Inventor: Daniel Ballatore, Goudon, France

[73] Assignee: International Business Machines Corporation, Armonk, N.Y.

[21] Appl. No.: 743,665

[22] Filed: Aug. 12, 1991

[30] Foreign Application Priority Data

Oct. 31, 1990 [EP] European Pat. Off. ......... 90480171.9

[51] Int. Cl.$^5$ .............................................. H03H 7/30
[52] U.S. Cl. .................................... 375/12; 333/28 R
[58] Field of Search ............................. 375/11, 12 B; 364/724.2; 333/18, 28 R

[56] References Cited

U.S. PATENT DOCUMENTS

| | | | |
|---|---|---|---|
| 4,047,013 | 9/1977 | Milewski | 375/13 X |
| 4,125,899 | 11/1978 | Kawai et al. | 375/12 X |
| 4,538,283 | 8/1985 | Hogge, Jr. | 375/14 |
| 5,065,410 | 11/1991 | Yoshida et al. | 375/12 X |

OTHER PUBLICATIONS

Archiv fur Elektronik und Ubertragungstechnik, vol. 40, No. 2, Mar./Apr. 1986, pp. 83–88, Stuttgart, De., F. Derr et al, "Adaptive Entzerrung Digitaler Ubertragungskanale Mittels Bestimmung der Impulsform".

Primary Examiner—Curtis Kuntz
Assistant Examiner—Tesfaldet Bocure
Attorney, Agent, or Firm—Edward H. Duffield

[57] ABSTRACT

Equalizer which includes a filter for compensating the frequency attenuation of the received signal transmitted by a Data circuit terminating equipment DCE through a base-band telecommunication line. The equalizer includes a detector determining the instants when the received signal is equal to a predetermined voltage reference value Vref and a timer for measuring the period DT separating two consecutive instants. The coefficients of the filters included in the equalizer are computed in accordance with the measured period DT. This provides an adaptive compensation of the distortion introduced by the telecommunication line without necessitating any training sequence. For this purpose, the equalizer further includes a comparator for comparing the measured DT value to a given DTref value. When the former is greater than the latter, the equalization process is increased by a factor depending on DTref, DTmax being the maximum measured value and DTmin corresponding to the minimum measured DT value. In the reverse case, the equalization process is decreased by another given factor depending on DTref and DTmin parameters.

10 Claims, 4 Drawing Sheets

EQUALIZATION SYSTEM AND METHOD FOR EQUALIZING A BASE-BAND TELECOMMUNICATION LINE

TECHNICAL FIELD OF THE INVENTION

The invention relates to the transmission of data by means of analog signals and more particularly to an adaptive equalization system and a method for equalizing the signal received by a base-band data circuit terminating equipment (DCE) through a telecommunication line.

BACKGROUND ART

In the transmission of data between a first data terminal equipment (DTE) and a second DTE over a telecommunication line, every DTE is associated with a DCE or modem which modulates and demodulates a carrier signal that is conveyed on the telecommunication line. In order to compensate the frequency distortion introduced by the impairments of the telecommunication line, every modem particularly includes an equalizer. Two major types of equalization systems are well-known in the art.

A first known type of equalization system includes a filter which is designed in order to compensate the distortion provided by a line considered as being a typical one. That typical line is chosen in such a way that its characteristics are approximately similar to the characteristics of a range of actual lines to which the DCE is likely to be connected. However, the drawback involved by that first type of equalization system consists in that the compensation of the frequency distortion is, at most, only an approximation.

A second type of equalization system known as adaptive equalizers is based on the use of an adaptive filter, the transfer function of which is adjusted at the beginning of the transmission of data in such a way that it is accurately inverse of that of the line. Adaptive equalizers therefore provide an accurate compensation of the distortion introduced by any actual line. Such equalizers generally involve the use of a training sequence transmitted over the telecommunication line and which is known from the receiving modem. The analysis of the received training sequence by the receiving modem allows the latter to measure the characteristics of the telecommunication line and therefore adjust the transfer function of the equalizer included in the receiving DCE for a accurate compensation of the distortion. Examples of such equalizers are shown in U.S. Pat. No. 4,047,013 and U.S. Pat. No. 4,089,061 patents assigned to the assignee of the present application and respectively entitled "Method and apparatus for fast determination of initial transversal equalizer coefficient values" and "Method and apparatus for determining the initial values of the coefficients of a complex transversal equalizer". The drawbacks of the adaptive equalization systems based on training sequences firstly consists in the fact that they involve complex technology and a large number of components. Secondly, in some particular applications, for instance in tailing mode or for use in digital networks, a training sequence in not ever possible. Indeed, in tailing mode, multiples tributary stations are connected to a controlling station via a tailed telecommunication network. Whenever an additional tributary station is connected to the network, the latter station is not allowed to request the transmission of a training sequence and thereby disturbing the communication between the already existing stations. The equalization system of the additional DCE consequently needs to be adapted to the characteristics of the network without any training sequence. Similarly, when a DCE is connected to a digital network, for instance Digital Data Services in the United States of America, the latter DCE has to adjust the parameters of its equalizer without any possibility of requesting a training sequence.

Therefore a need has appeared in the telecommunication field for a simple adaptive equalizer which would not require any training sequence and which nevertheless would provide an effective compensation of the distortion introduced by a telecommunication line.

OBJECTS OF THE INVENTION

It is an object of the invention to provide a simple equalizer which compensates for the distortion introduced by a telecommunication line without requiring a large number of components.

It is another object of the invention to provide a simple and effective equalizer for a base band data circuit terminating equipment.

It is a further object of the invention to provide a simple method of equalization a base band line which does not require the use of a training sequence.

BRIEF SUMMARY OF THE INVENTION

These and other objects of the invention are provided by means of the equalization system according to the present invention which includes filtering means for compensating the frequency attenuation on the received signal transmitted by a DCE through a base-band telecommunication line. The equalizer includes means for detecting the instants when the received signal is equal to a predetermined voltage reference value Vref and means for measuring the period DT separating two consecutive of said instants. The coefficients of the filters included into the equalizer are computed in accordance with the measured period DT. That provides an adaptive compensation of the distortion introduced by the telecommunication line without necessitating any training sequence.

According to a preferred embodiment of the invention, the equalizer further includes means for comparing the measured DT value to a given DTref value. When the former is superior to the latter, the equalization process is increased by a factor depending on DTref, DTmax being the maximum measured value and DTmin corresponding to the minimum measured DT value. given value. In the reverse case, the equalization process is decreased by another given factor depending on DTref and DTmin parameters.

The invention also provides an equalization method for compensating the frequency attenuation on a signal transmitted by a first DCE and received by a second DCE which includes the step of measuring the level of the incoming signal Vabs, detecting the instants when the latter received signal Vabs is equal to a predetermined voltage reference value Vref, measuring the period DT separating two consecutive of said instants and, monitoring the filters parameters of the equalization process in response to the measured DT period. Thus, the equalization process is automatically adapted to the characteristics of the line without necessitating any training sequence.

According to a preferred embodiment of the invention, the method involves the steps of computing the peak value Vp in order to determine the said voltage reference value Vref, DTmin corresponding to the minimum measured DT period and DTmax which corresponds to the maximum measured DT. The monitoring process of the equalization is performed by comparing the measured period DT to a predetermined fixed period value DTref. According to the result of the latter comparison, the equalization process is increased by a factor depending on DTref, DTmin and DTmax or decreased by a second factor depending on DTref and DTmin. Parameters Vp, Vref, DTmin and DTmax are reset at the beginning of every cycle in order to improve the immunity to noise. During the first middle of the latter cycle, the monitoring process of the filters coefficient is disabled until the new computed parameters Vp, Vref, DTmin and DTmax are accurately representative of the characteristics of the line.

DESCRIPTION OF THE PREFERRED EMBODIMENT OF THE INVENTION

Figure 1A:
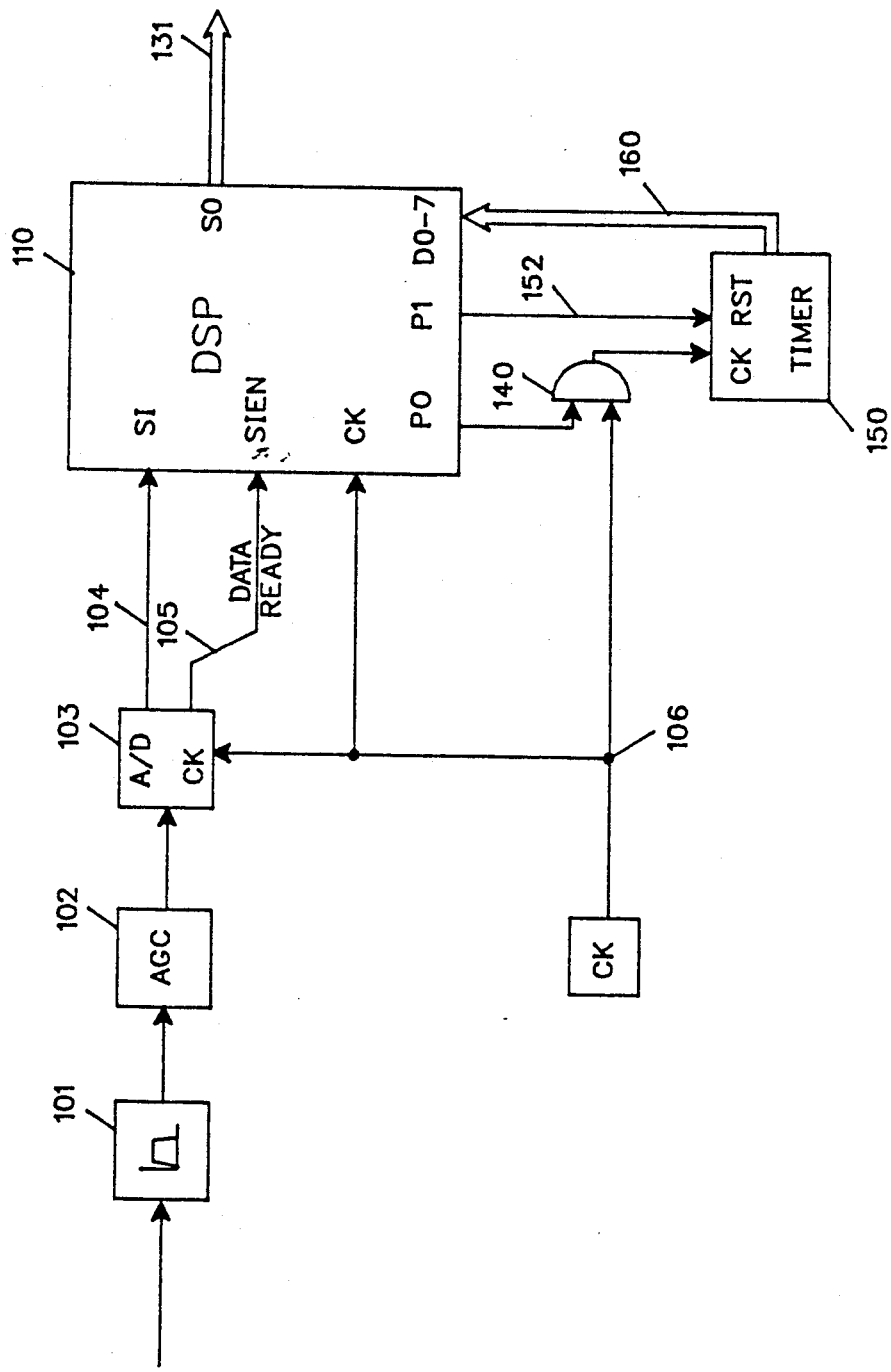
FIG. 1A describes the preferred embodiment of the adaptive equalizer according to the present invention.

With respect to FIG. 1A, there is shown the receiving part of a DCE including the preferred embodiment of the equalizer system according to the invention. The received signal is filtered by an analog bandpass filter (BPF) 101 to reject out-of-band noise and prevent aliasing, passes through an automatic gain controlled (AGC) amplifier 102 which limits the dynamic of the signal introduced into analog-to-digital converter 103. The use of AGC 102 particularly results in the possibility of limiting the required number of bits of A/D converter 103. The signal is sampled in A/D converter 103 at a rate n/T (typically n=10 or 12) with the sampling time of the analog-to-digital converter 103 being derived from the received signal. The samples produced by A/D 103 are then transmitted to the Serial input SI of a processor 110 via a lead 104 and are then digitally equalized by means of the latter processor. Processor 110 is particularly used to embody a set of two digital first-order recursive filters 107A and 107B which will be detailed with respect to FIG. 1B. In addition to the set of above filters, the processor 110 is also used for performing some general control functions as will be detailed hereinafter with respect to FIGS. 2A and 2B. In the preferred embodiment of the invention, processor 110 is a digital signal processing (DSP) system such as a common NEC 7720 DSP processor.

The output lead 104 of A/D converter 103 serially transmits the digital result of a conversion whenever the latter digital result is available. Whenever, the digital result of a elementary conversion is available, A/D 103 activates the serial input enable SIEN lead of procesor 110 via control line 105. The activation of line 105 has the effect of enabling the shift clock to the serial input register included into processor 110. The serial loading of the digital result of A/D 103 is performed by means of a clock signal 106 provided by a clock circuit and transmitted to the clock CK input lead of processor 110 and to the clock input lead of A/D 103 and also to a first input of a AND gate 140. Processor 110 has an output port P0 which is connected to a second input of AND gate 140, the output of which being used for controlling the clock input of a timer 150 as will be described hereinafter. Processor 110 has a second output port P1 which is connected to a reset RST input of timer 150 via a lead 152. Processor 110 has therefore the possibility of resetting timer 150 by activating its output port P1. The content of the digital value reached by timer 150 is available on bus 160 which is connected to the D0-D7 input bus of processor 110. When the digital samples produced by A/D 103 have been equalized by means of filters 107A and 107B involved in the present invention, the latter samples are available on the "Serial Data Out" lead 131 (S0) of processor 110 for processing purpose by other circuits included in the DCE. The latter circuits included into the DCE generally consists of usual data recovery and clock recovery circuits. It should be noticed that DSP processor 110 can also perform the latter data recovery and clock recovery functions. That implies however the use of a DSP allowing sufficient digital processing power. In the latter case, the "Serial Data Out" 131 can be used to output the recovered data.

Figure 1B:
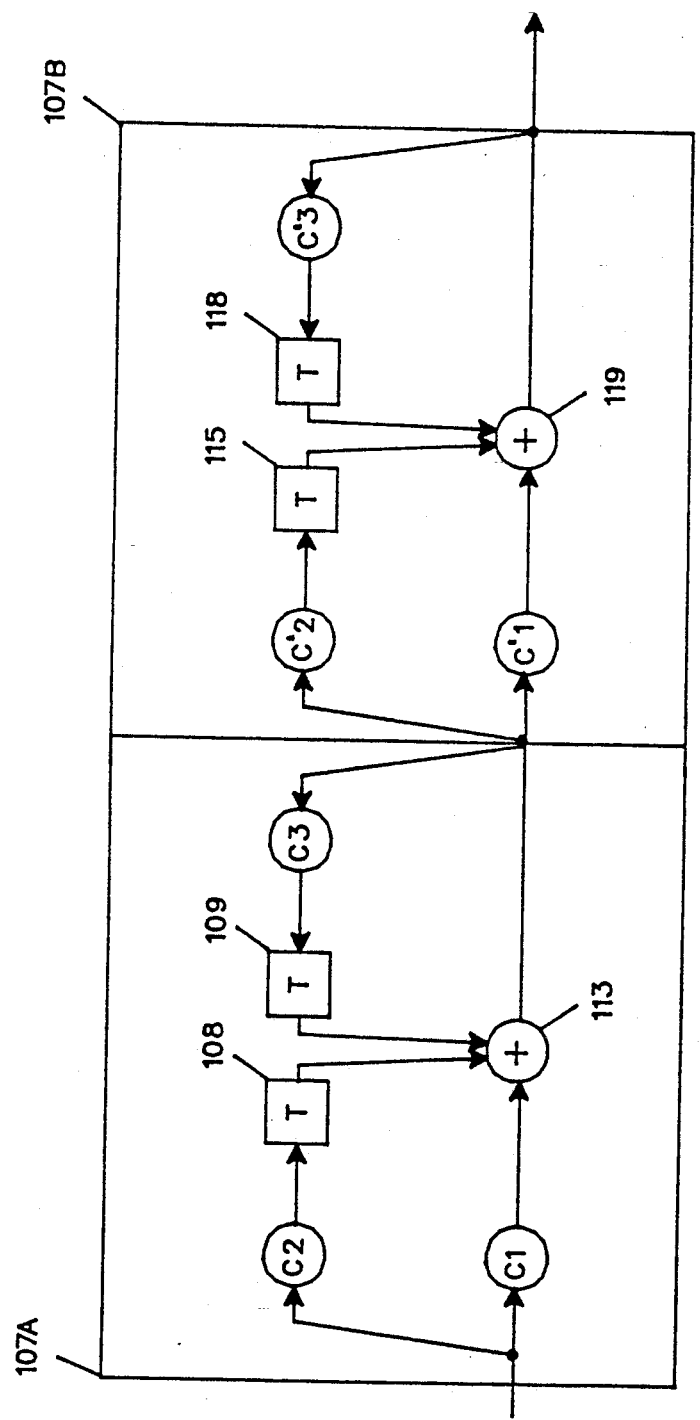
FIG. 1B shows the preferred embodiment of the set of two recursive first order filters used in the preferred embodiment of the invention.

With respect to FIG. 1B, the equalizer according to the invention involves the two mentioned first order recursive filters 10A and 107B. In the first digital filter 107A, the samples are multiplied by gain C2 before entering tap 108. The output of tap 108 is entered into a first input of adder 113. The samples on bus 104 are also multiplied by gain C1 before being transmitted to a second input of adder 113. The output of adder 113 are multiplied by gain C3 before entering a tap 109, the output of which being connected to a third input of adder 113. It therefore appears that first-order filter 107A performs a transfer function which is equivalent in analog to:

$$T = \frac{1 + KAs}{1 + As}$$

where s is equal to jw/wo, K is a constant (K equal to 6 in the preferred embodiment of the invention for bipolar code) and A is a parameter of equalization which is computed as described hereinafter.

The second recursive filter 107B similarly includes two taps 115 and 118, an adder 119 and three gains C'1, C'2 and C'3. It should be noticed that equalizer 107 can be limited to only filter 107A for simplicity purpose. The continuous update of gains C1, C2, C3, (respectively C'1, C'2 and C'3) in the two digital filters 107A and 107B are performed according to the flow chart of FIGS. 2A and 2B detailed hereinafter and after the computation of parameter A0 (resp. A1) by means of DSP 110. The parameter A0 or A1 above is computed by processor 110 according to the flow charts of FIGS. 2A and 2B, and the result of the latter computation is then used for updating the values of the coefficients of both filters 107A and 107B.

Figure 2A:
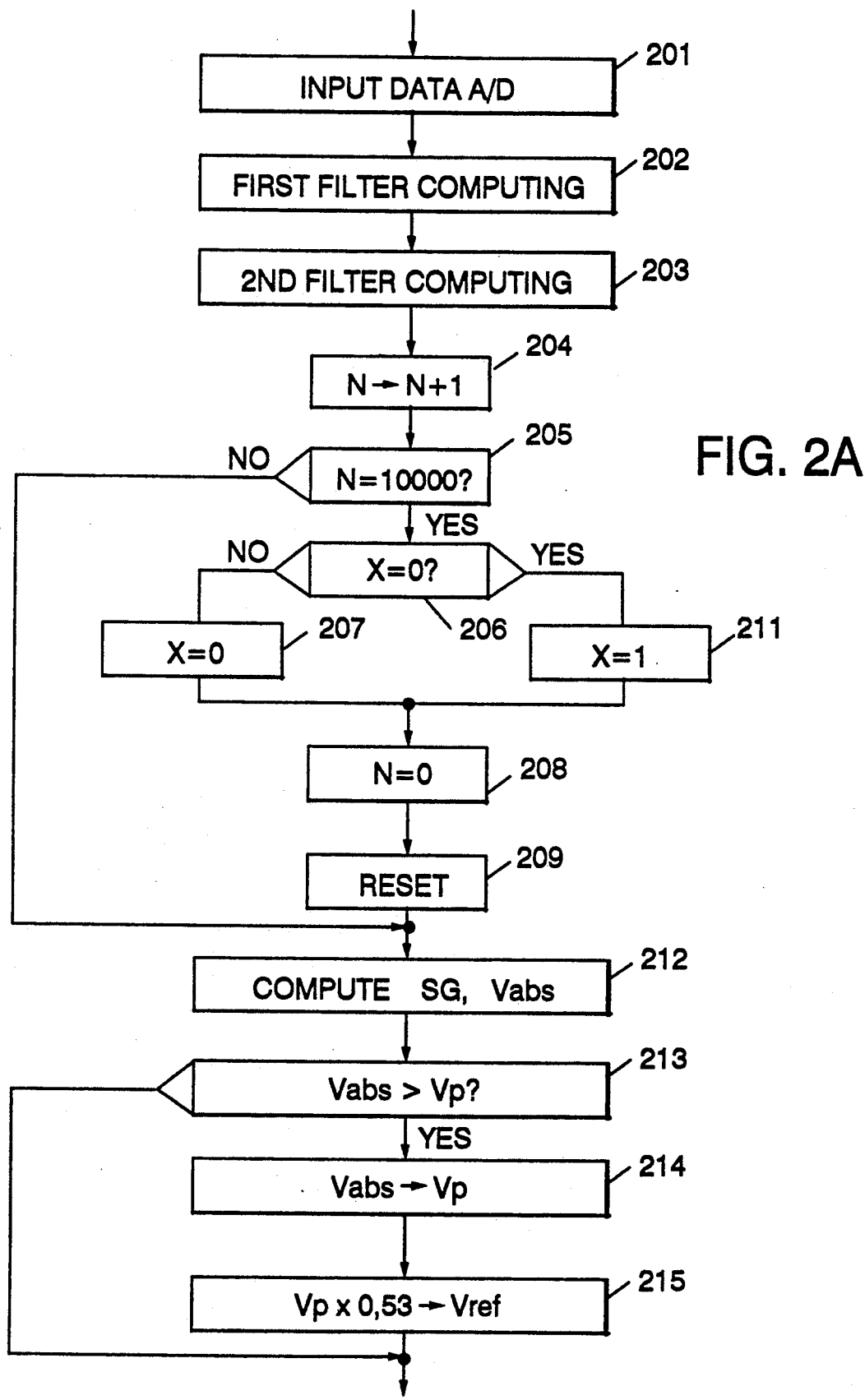
FIGS. 2A and 2B are flow charts detailing the operating of the adaptive equalizer according to the present invention.
Figure 2B:
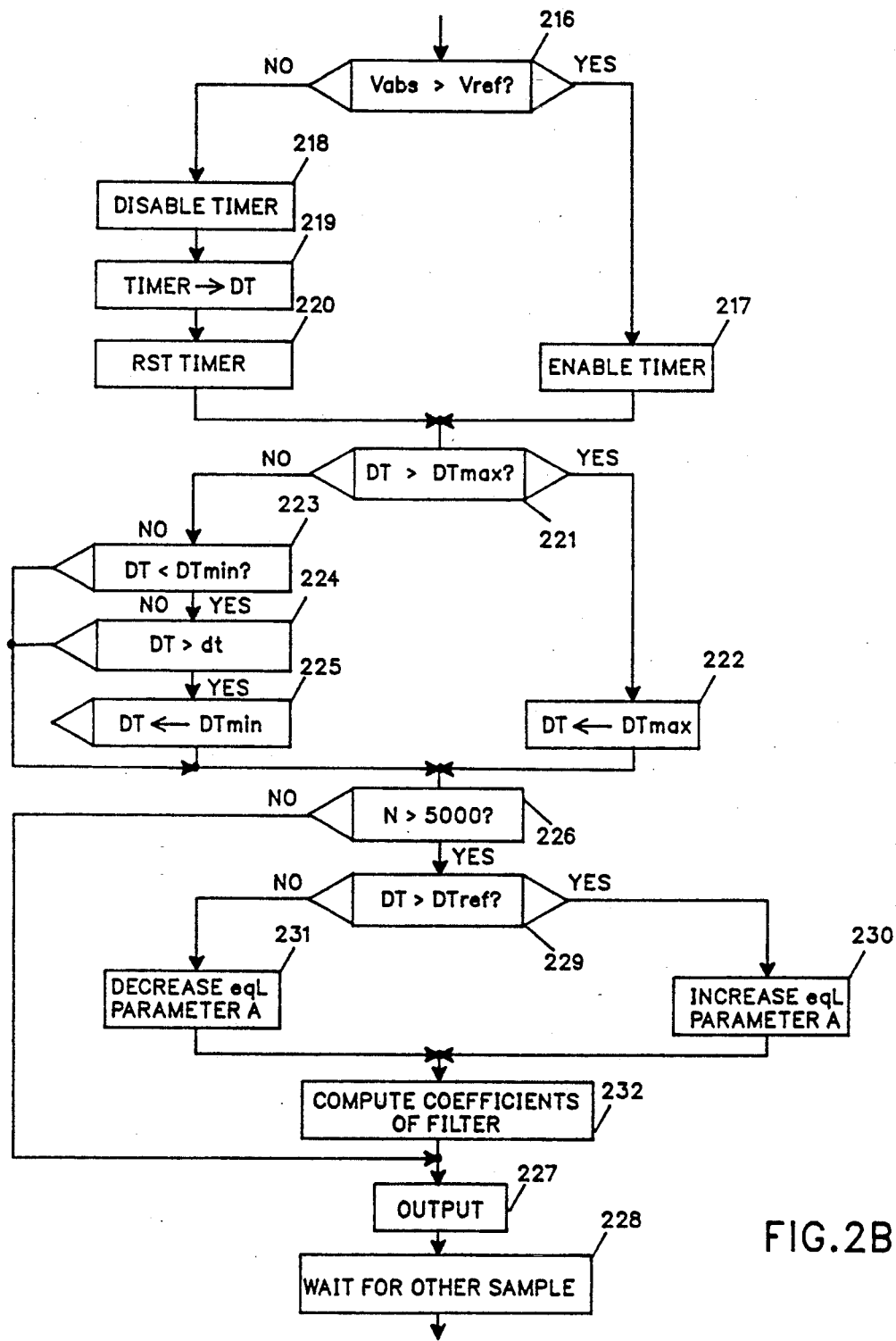

With respect to FIGS. 2A and 2B, there are illustrated the different steps involved in the operating mode of the equalizer according to the invention. At the power on of the DCE, the parameters Vp, Vref, DTmin, DTmax, N, X and the contents of the timer is reset. On the contrary, the parameters Adt, DTref and coefficients C1, C2, C3, C'1, C'2, C'3 are fixed to predetermined values as will be described hereinafter. After the power on, the process starts with the detection by processor 110 of the FIG. 1A of an interrupt pulse on its SIEN lead 105. At the occurrence of the latter pulse on SIEN lead 105, processor 110 loads the digital sample into its storage, step 201. Step 202, processor 110 computes the output of the first digital filter 107A in accordance with the values stored into the coefficient parameters C1, C2 and C3. After the power on of the DCE, it should be noticed that the process will require a number of iterations until the above coefficients C1, C2 and C3 are perfectly adapted (in accordance with the step 232 of FIG. 2B) to the characteristics of the telecommunication line. Similarly, step 203, processor 110 computes the output of the second digital filter 107B in accordance with the values stored into the coefficient parameters C'1, C'2 and C'3. Step 204, processor 110 increments counter N. Step 205, processor 110 checks whether the N counter has reached a predetermined fixed value. In the preferred embodiment of the invention that predetermined value is fixed to 10000, so that the latter N counter reaches the value 10000 every 1000 baud times (for a sampling rate n/T equal to 10 samples per baud time). If the contents of N counter has not reached the predetermined fixed value, the process proceeds to step 212. On the contrary, if the contents of N counter has reached the latter value, processor 110 proceeds to step 206 where a test is performed in order to determine the value of X parameter. If X is equal to Zero, processor 110 stores a ONE into the latter parameter, step 211 and the process proceeds to step 208. In the reverse case, processor stores a ZERO into the latter parameter, step 207 and then goes to step 208. Step 208, the processor 110 resets the N counter. The process then proceeds to the general reset of parameters Vp, Vref, DTmin, DTmax, step 209. It should be noticed that parameter A0 (resp. parameter A1) which has been computed in accordance with the step 231 and 230 of FIG. 2B as will be described hereinafter remains unchanged at that step 209 of the equalization process. Step 212, processor 110 computes the absolute value Vabs of the output of the second filter 107B and determines its sign SG. Step 213, the latter absolute value Vabs is compared to the contents of parameter Vp. In the case when Vabs is inferior to Vp, then processor 110 goes to step 216 of FIG. 2B. In the reverse case, the process proceeds to step 214 where parameter Vp is updated with the value Vabs which has just been computed. Step 215, the contents of parameter Vp is multiplied by a determined fixed coefficient which is approximately equal to 0.5 and then stored into parameter Vref. The following codes can be equalized: PRZ, BP.RZ, AMI, DI.RZ, DI.NRZ, PST.RZ, MST.RZ and DIPULSE (cf Revue technique THOMSON-CSF -vol. 11 No. 2 June 1979), all those being characterized by a pulse having a constant period whatever the content of the coded information.

It was also experimented that a value of 0.53 for the fixed coefficient, particularly provides a good performance in term of transmission error versus signal to noise ratio, for a bipolar code BP.RZ.

After the completion of step 215, the process proceeds to step 216 of the FIG. 2B where processor 110 checks whether the absolute value Vabs which has been computed step 212 is superior to Vref, in which case processor 110 enables timer 150. For that purpose, processor 110 activates its PO port connected to one input of AND gate 140. Consequently, the clock pulses on lead 106 are transmitted to the clock input of timer 150 what results in the latter timer counting from "00" (in hexadecimal) at the pulse of the clock existing on lead 106. When step 217 completes, the process proceeds to step 221. On the contrary, in the case when Vabs is inferior to Vref, processor 110 disables timer 150 by deactivating its output port PO, step 218. Then, step 219, processor 110 reads the contents of timer 150 transmitted to the D0-D7 input leads via bus 160. The contents of timer 150 which is stored into DT parameter is representative of the period of time when the absolute value of the digital output of the second filter 107b is superior to Vref. The evaluation parameter DT provides an estimation of the "opening" of the eye pattern of the received signal and therefore an estimation of the equalization correction which is required in order to improve the equalization process. Step 220, processor 110 activates its P1 output port connected to the reset RST input of timer 150 via lead 152, what entails the reset of the latter timer. Step 221, processor 110 checks whether the value of parameter DT is superior to DTmax. In the case when DT is superior to DTmax, processor 110 loads the contents of DT into parameter DTmax, step 222, and then proceeds to step 226. In the case when DT is inferior to DTmax, processor 110 proceeds to step 223 where a test is performed in order to determine whether DT is inferior to DTmin, step 223. If DT is not inferior to DTmin, the process proceeds to step 226. In the reverse case, a test is performed in order to check whether the measured parameter DT is superior to a predetermined parameter dt, the value of which being chosen and fixed so that processor 110 will not consider too low values of DT. Those low values of DT generally corresponds to erroneous measures of the step 219 and are due to, for instance, the noise existing on the telecommunication line and also to glitches coming from existing switching components. Step 224 therefore prevents processor 110 from taking into account errors coming from glitches and more generally noise. In the preferred embodiment of the invention, the predetermined fixed value dt which is used by processor 110, and which can be stored into a PROM storage, is chosen to be equal to 1/10 the baud time. When DT is inferior to dt, processor 110 proceeds to step 226. On the contrary when DT is superior to dt, thus indicating that the parameter DTmin should be updated in response to a modification in the characteristics of the telecommunication line, processor 110 loads the measured DT value into DTmin register, step 225, and proceeds to step 226. Step 226, a test is performed in order to check whether N counter has reached half the range of values which is counted by N counter, that is to say 5000 (N=1 to 10000) in the preferred embodiment of the invention. If the contents of N counter is inferior to 5000, then processor 110 goes to step 227 where the output of the equalized samples is provided on lead SO 131 and the process waits for the occurrence of a next sample coming from A/D 103, step 228. If the contents of N counter is superior to 5000, then processor 110 proceeds to step 229. The test performed step 226 prevents the update of the parameter A0 or A1 (and therefore the update of the filters coefficients C1-C2-C3 or C'1-C'2-C'3 in steps 230, 231 and 232 in accordance with the value of X parameter) as long as a sufficient number of samples has been taken in account by processor 110 for the estimation of parameters Vp, Vref, DTmin and DTmax. That allows to separate the ongoing process of computation of the parameters Vp, Vref, DTmin and DTmax which are reset at the beginning of every cycle (at step 209), and the update of the coefficients of the digital filters which is authorized only during the second middle of the considered cycle. During the first middle of one cycle, that is to say during a period of 5000 baud times in the preferred embodiment of the invention, the digital filters operate with coefficients C1-C2-C3 C'1-C'2-C'3, the value of whose having been computed during the second middle of a preceding cycle. It has appeared that this process provides a good immunity to the noise. Moreover, the iterative reset of the parameters Vp, Vref, DTmin and DTmax every 1000 baud times cycle allows the equalization of the incoming signal even in the case of substantial changes in the telecommunication line characteristics.

Step 229, a test is performed in order to determine whether DT is superior to a predetermined fixed parameter DTref which is read from the PROM storage included into the modem. That DTref parameter is determined by reference to the nominal DT parameter which would be measured step 219 and would characterize an incoming signal being transmitted through a ideal communication line which would not require any equalization process. The value of DTref can be determined by considering an ideal opening of the "eye" pattern of the signal received by a receiving modem, characteristic of an undistorted signal considering a given transmission rate, a given filtering process performed into the transmitting modem and a given transmission code. For instance, considering a bipolar transmission of 2400 bps on a line which does not introduce any distortion, considering also that the emitting modem includes a first order filter (fc=12500 Hz) for limiting the spectrum in the high frequencies, the signal at the output of the emitting modem and at the input of the receiving modem would be characterized by an eye pattern having an maximum opening, the period DT measured at 0.53 times the peak value would be approximately equal to 200 microseconds. That value would be introduced into DTref parameter.

For an other type of code, for instance one among the above listed codes, the value to store into DTref parameter can be found out by means of one of the two following procedures: A first procedure would consist in the determination of the ideal or theoretical "eye pattern" of the incoming signal for a given transmission rate and for the considered filtering function into the DCE emitter. Then, a determination or a graphically measure of the period between the two instants when the incoming signal has reached a voltage value which is equal to 0.50 times the peak voltage value of the eye, directly provides the parameter DTref. A second procedure would consist in the wrapping of the DCE emitter on the DCE receiver. Then an observation on an usual oscilloscope of the pattern of the eye, followed by a direct measure of the which separates the two instant when the voltage of the incoming signal is equal to 0.50 times the peak voltage value of the eye eventually provides the value of DTref.

In the case when DT is superior to DTref, what only occur when the incoming signal is underequalized, processor 110 increases the parameter A0 or A1 according to the value stored into X register, step 230. This is achieved by computing a new parameter A'1 or A'2 in accordance with the following relation:

$$A' = A(1 + k((DTmax - DTref) + (DTmax - DTmin)))$$

where k is a constant.

The new value A'0 (reps. A'1) is then stored into register A0 (resp. A1) and processor 110 proceeds to step 232.

On the contrary, if DT is found to be inferior to DTref, what can occur mostly when the incoming signal is overequalized and also at some rare cases when the incoming signal is underequalized, processor 110 decreases the considered parameter A0 or A1, step 231. This is achieved by computing a new parameter A'0 or A'1 in accordance with the following relation: $A' = A(1 - k(DTref - DTmin))$ where k is a constant. The updated value A0 or A1 (in accordance with the value stored into X register) is then stored its corresponding register A0 or A1 and the process proceeds to step 232. It should be noticed that step 231 allows an appropriate update of parameter A0 or A1 when the incoming signal is overequalized since the latter parameter is increased. However, it has been indicated above that at some rare occasions, step 231 is also likely to be performed when the signal is underequalized, this entailing a decrease of the equalization process. Such occasions may occur immediately after a silence in the incoming signal or still, after a succession of ZERO data in some codes such as the bipolar code where a ZERO is not coded. The analysis of the pulse which will occur after the above succession of ZERO will lead to a measure of DT having a weak value. That is likely to entail processor 110 to proceed to step 231 and therefore to decrease the considered parameter A, even though the incoming signal is underequalized. Such a decrease of parameter A0 or A1 may consequently appear as an erroneous correction in the equalization process. It actually appears that such the above erroneous correction does not involve significant decrease in the equalization efficiency for the two following reasons. Firstly, the above occasions which are likely to lead to an erroneous update of the parameter A rarely occur. Secondly, it should be noticed that in the case when such occasions actually occur, the measured DT is very close to DTref, what result in the fact that the expression (DTref−DTmin) is very low and also the term k(DTref−DTmin) used in the above relation. The erroneous correction appears negligible and therefore does not affect the efficiency of the equalizer.

Step 232, processor 110 computes the set of coefficient C1-C2-C3 or C'1-C'2-C'3 according to the value of parameter X with the corresponding parameter A0 or A1 which was updated at the preceding step. If X is equal to 0, then the coefficients C1, C2 and C3 of the first filter 107A are computed. On the contrary, if X is equal to 1, the coefficients C'1, C'2 and C'3 of the second filter 107B are computed. For this purpose, processor 110 uses the following relationships:

$$C1 = \frac{1 + K.A0}{1 + A0}$$

$$C2 = \frac{1 - K.A0}{1 + A0}$$

$$C3 = \frac{A0 - 1}{1 + A0}$$

and uses the same expressions for the coefficients C'1, C'2, C'3 with A1 parameter.

A0 and A1 are fixed to 1 at power ON reset, and are >0.1 in the equalization process to avoid convergence problems of the digital filters.

Then, processor 110 proceeds to step 227 where the latter outputs the digital equalized value of the incoming signal on lead S0 131 of FIG. 1.

I claim:

1. Equalization system for a base-band line DCE including filtering means (107A, 107B) for compensating the frequency attenuation of the received signal provided by the line characterized in that it further includes:

means (110, 216) for detecting the instants in time when the received signal is equal to a predetermined voltage reference value Vref, means (150) for measuring the period DT separating two consecutive of said instants, means (110, 231, 230, 229, 232) for monitoring the parameters (C1, C2, C3) of said filter in response to said measured period DT, whereby said equalization system is automatically adapted to the characteristics of the line without necessitating a training sequence.

2. Equalization system according to claim 1 characterized in that said monitoring means includes:

means (110, 229) for comparing said measured period to a predetermined fixed period value DTref, means (110, 231) for decreasing the parameters of said filter when said measured period DT is less than said predetermined fixed period value DTref, means (110, 230) for increasing the parameters of said filter when said measured period DT is greater than said predetermined fixed period value DTref.

3. Equalization system according to claim 2 characterized in that it further includes:

means (213) for determining a peak value Vp of the received incoming signal, means (110, 215) for multiplying said peak value Vp by a given constant in order to provide said predetermined voltage value Vref.

4. Equalization method for compensating the distortion introduced into a signal which is transmitted by a first DCE to a second DCE including a filtering means via a telecommunication line characterized in that it involves the step of:

measuring (212) a level Vabs of the received signal, detecting (216) the instants in time when the measured signal level Vabs is equal to a predetermined voltage reference value Vref, measuring (217, 219, 220) a period DT separating two consecutive of said instants, monitoring (229, 230, 231, 232) the filter parameters of the filtering means in response to said measured period DT, whereby the equalization process is automatically adapted to the characteristics of the telecommunication line without necessitating a training sequence.

5. Equalization method according to claim 4 characterized in that it further involves the step of:

computing (214) a Vp value representative of a peak value voltage of said received signal, multiplying (215) said Vp value by a given coefficient k in order to provide said predetermined voltage reference value Vref.

6. Equalizating method according to claim 5 characterized in that said monitoring step involves the step of:

comparing (229) said measured period DT to a predetermined fixed period value DTref, increasing (230) the parameters of said filter whenever said measured period is greater than said predetermined period value DTref, decreasing (232) the parameter of said filter whenever said measured period is less than said predetermined period value DTref.

7. Method according to claim 6 involving the step of:

computing (222) a DTmax value representative of the maximum value of said measured period DT, computing (223) a DTmin value representative of the minimum value of said measured period DT, and characterized in that said increasing step further involves the step of updating a parameter A according to the relation $A' = A(1 + k((DTmax - DTref) + (DTmax - DTmax - DTmin)))$ where k is a constant, which latest value of the A parameter is used to compute the coefficient of the equalization filter; and said decreasing step further includes the step of updating the value of said parameter A according to the relation $A' = A(1 - k(DTref - DTmin))$.

8. Method according to claim 7 characterized in that it further involves the step of:

resetting said parameters Vp, Vref, DTmin and DTmax at the beginning of a given cycle in order to take into account changes in the characteristics of the telecommunication line;

disabling said increasing and decreasing parameters of said filter during the first half of every cycle, enabling said increasing and decreasing parameters of said filter during the second half of every cycle when said parameters Vp, Vref, DTmin and DTmax are accurately representative of the actual characteristics of the line.

9. Method according to claim 8 characterized in that the filter of the parameters of said filter is a first order recursive filter, the coefeicients of which are computed according to the following relations:

$$C1 = \frac{1 + K.A}{1 + A}$$

$$C2 = \frac{1 - K.A}{1 + A}$$

$$C3 = \frac{A - 1}{1 + A}$$

10. Method according to claim 9 characterized in that said parameters of said filter involves two first order recursive filters.

* * * * *